United States Patent
Fowers et al.

(10) Patent No.: US 9,035,874 B1
(45) Date of Patent: May 19, 2015

(54) PROVIDING USER INPUT TO A COMPUTING DEVICE WITH AN EYE CLOSURE

(71) Applicant: Amazon Technologies, Inc., Reno, NV (US)

(72) Inventors: Timothy Lee Fowers, Lake Forest, CA (US); William Allan Dugan, Irvine, CA (US); Ion Hardie, Lake Forest, CA (US); Isaac Jeremy Shepard, Ladera Ranch, CA (US); Brian David Fisher, Irvine, CA (US); Robert Gustave Schiewe, Lake Forest, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 64 days.

(21) Appl. No.: 13/791,265

(22) Filed: Mar. 8, 2013

(51) Int. Cl.
  *G06F 3/00* (2006.01)
  *G06F 3/01* (2006.01)
  *G02B 27/00* (2006.01)

(52) U.S. Cl.
  CPC ............ *G06F 3/013* (2013.01); *G02B 27/0093* (2013.01); *G06F 3/005* (2013.01)

(58) Field of Classification Search
  CPC ......... G06F 3/013; G06F 3/005; G06F 21/32; G02B 27/017; G02B 27/0093
  USPC ................................................. 345/156–184
  See application file for complete search history.

(56) References Cited

U.S. PATENT DOCUMENTS

| 5,563,988 | A | 10/1996 | Maes et al. |
| 5,616,078 | A | 4/1997 | Oh |
| 6,272,231 | B1 | 8/2001 | Maurer et al. |
| 6,385,331 | B2 | 5/2002 | Harakawa et al. |
| 6,434,255 | B1 | 8/2002 | Harakawa |
| 6,633,305 | B1 * | 10/2003 | Sarfeld .......................... 345/671 |
| 6,750,848 | B1 | 6/2004 | Pryor |
| 6,863,609 | B2 | 3/2005 | Okuda et al. |
| 7,301,526 | B2 | 11/2007 | Marvit et al. |

(Continued)

FOREIGN PATENT DOCUMENTS

| CN | 1694045 A | 11/2005 |
| JP | 2002-164990 | 6/2002 |

(Continued)

OTHER PUBLICATIONS

Nokia N95 8GB Data Sheet, Nokia, 2007, 1 page.

(Continued)

*Primary Examiner* — Dwayne Bost
*Assistant Examiner* — Larry Sternbane
(74) *Attorney, Agent, or Firm* — Novak Druce Connolly Bove + Quigg LLP

(57) ABSTRACT

Various embodiments enable additional content or features to be displayed to a user in response to detecting one eye of the user being closed either as a wink or for a duration of time. In one example, the additional content is graphical overlay, such as a menu containing selectable graphical elements to perform functions related to an application, game, or content, of global navigational features of the computing device in general, or to alternate views, features, or supplemental content for an application or game currently being displayed on a computing device. In one example, the overlay may be displayed only as long as the user keeps one eye closed or, alternatively, the user could wink to display the overlay and provide some other input to remove the overlay.

18 Claims, 10 Drawing Sheets

(56) References Cited

U.S. PATENT DOCUMENTS

| | | | |
|---|---|---|---|
| 7,379,566 B2 | 5/2008 | Hildreth | |
| 7,401,783 B2 | 7/2008 | Pryor | |
| 7,519,223 B2 | 4/2009 | Dehlin et al. | |
| 7,949,964 B2* | 5/2011 | Vimme | 715/853 |
| 2002/0071277 A1 | 6/2002 | Starner et al. | |
| 2004/0140956 A1 | 7/2004 | Kushler et al. | |
| 2007/0118520 A1* | 5/2007 | Bliss et al. | 707/5 |
| 2007/0164989 A1 | 7/2007 | Rochford et al. | |
| 2007/0273611 A1* | 11/2007 | Torch | 345/8 |
| 2008/0005418 A1 | 1/2008 | Julian | |
| 2008/0013826 A1 | 1/2008 | Hillis et al. | |
| 2008/0019589 A1 | 1/2008 | Yoon et al. | |
| 2008/0040692 A1 | 2/2008 | Sunday et al. | |
| 2008/0136916 A1 | 6/2008 | Wolff | |
| 2008/0158096 A1 | 7/2008 | Breed | |
| 2008/0174570 A1 | 7/2008 | Jobs et al. | |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0079813 A1 | 3/2009 | Hildreth | |
| 2009/0265627 A1 | 10/2009 | Kim et al. | |
| 2009/0307726 A1* | 12/2009 | Levin et al. | 725/46 |
| 2009/0313584 A1 | 12/2009 | Kerr | |
| 2013/0169530 A1* | 7/2013 | Bhaskar et al. | 345/157 |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | 02/15560 A3 | 2/2002 |
| WO | 2006/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 27, 2011", U.S. Appl. No. 12/332,049, 66 pages.

"Final Office Action dated Jun. 6, 2013", U.S. Appl. No. 12/332,049, 70 pages.

"First Office Action dated Mar. 22, 2013", China Application 200980146841.0, 39 pages.

"International Search Report dated Apr. 7, 2010", International Application PCT/US2009/065364, 2 pages.

"International Written Opinion dated Apr. 7, 2010", International Application PCT/US2009/065364, 7 pages.

"Introducing the Wii MotionPlus, Nintendo's Upcoming Accessory for the Revolutionary Wii Remote at Nintendo:: What's New", Nintendo Games, http://vvww.nintendo.com/whatsnew/detail/eM-MuRj_N6vntHPDycCJAKWhE09zBvyPH, Jul. 14, 2008, 2 pages.

"Non Final Office Action dated Nov. 7, 2012", U.S. Appl. No. 12/332,049, 64 pages.

"Non Final Office Action dated Apr. 2, 2013", Japan Application 2011-537661, 2 pages.

"Non Final Office Action dated Jun. 10, 2011", U.S. Appl. No. 12/332,049, 48 pages.

"Office Action dated May 13, 2013", Canada Application 2,743,914, 2 pages.

Brashear, Helene et al., "Using Multiple Sensors for Mobile Sign Language Recognition", International Symposium on Wearable Computers, 2003, 8 pages.

Cornell, Jay, "Does This Headline Know You're Reading It?", h+ Magazine, located at <http://hplusmagazine.com/articles/ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond, "Eye Toy (PS2)", http://www.archive.gamespy.com/hardware/august03/eyetoyps2/index.shtml, Aug. 16, 2003, 2 pages.

Schneider, Jason, "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter, "Control an iPod with Gestures", http://www.videsignline.com/howto/170702555, Sep. 11, 2005, 4 pages.

Zyga, Lisa, "Hacking the Wii Remote for Physics Class", PHYSorg.com, http://vvww.physorg.com/news104502773.html, Jul. 24, 2007, 2 pages.

* cited by examiner

PROVIDING USER INPUT TO A COMPUTING DEVICE WITH AN EYE CLOSURE

BACKGROUND

People are increasingly using portable computing devices in a wider variety of ways and increasingly relying upon the same to access various types of content. For example, many users rely upon computing devices to store contact information, user schedules, task lists, and other such information. Unfortunately, the data is often not organized or presented in a way that is intuitive for many users. Further, for portable computing devices such as smart phones or tablet computers, the screen size can be limited such that it can be difficult for a user to locate information due to the size of the various icons or elements with respect to the size of a user's finger. Thus, as technology advances and as people are increasingly using portable computing devices in a wider variety of ways, it can be advantageous to adapt the ways in which people access content through the same.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to a computing device. In particular, various approaches enable a user to provide input to a computing device with an eye closure input, such as a wink or closing one eye for a predetermined period of time as captured by at least one sensor. For example, a computing device can detect whether or not a user is winking (i.e. closing one eye for at least a determined period of time) and, in response, display an overlay or alternate view of content being displayed.

In at least one embodiment, content is displayed on a display of a computing device while image information of a user is being captured. The image information can include information associated with tracking each of two eyes of the user over a period of time that the user is engaging the computing device. In response to detecting one eye of the user being closed, a graphical overlay can, in one example, be displayed over content displayed on the display element. In one example, once the computing device detects both eyes being open again, the overlay can be removed from the display element.

As discussed herein, an overlay can include a menu containing selectable graphical elements to perform functions related to an application, game, or content, to global navigational features of the computing device in general, or to alternate views, features, or supplemental content for an application, game, or content currently being displayed on the display element. In one example, the overlay may be displayed only as long as the user keeps one eye closed or, alternatively, the user could wink (i.e., closing and opening one eye) to display the overlay and provide some other input (i.e., a second wink, touch selection input, or voice command) to remove the overlay.

Various other functions and advantages are described and suggested below as may be provided in accordance with the various embodiments.

Figure 1A:
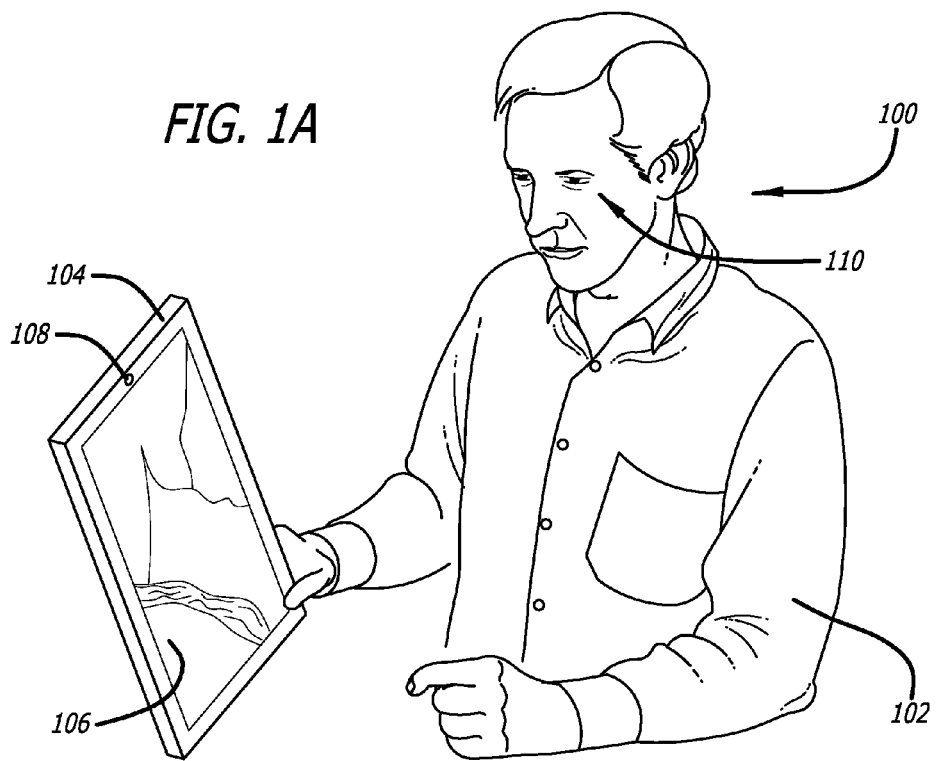
FIGS. 1A-1B illustrates an example situation showing a user closing one eye to provide input to a computing device in accordance with at least one embodiment.
Figure 1B:
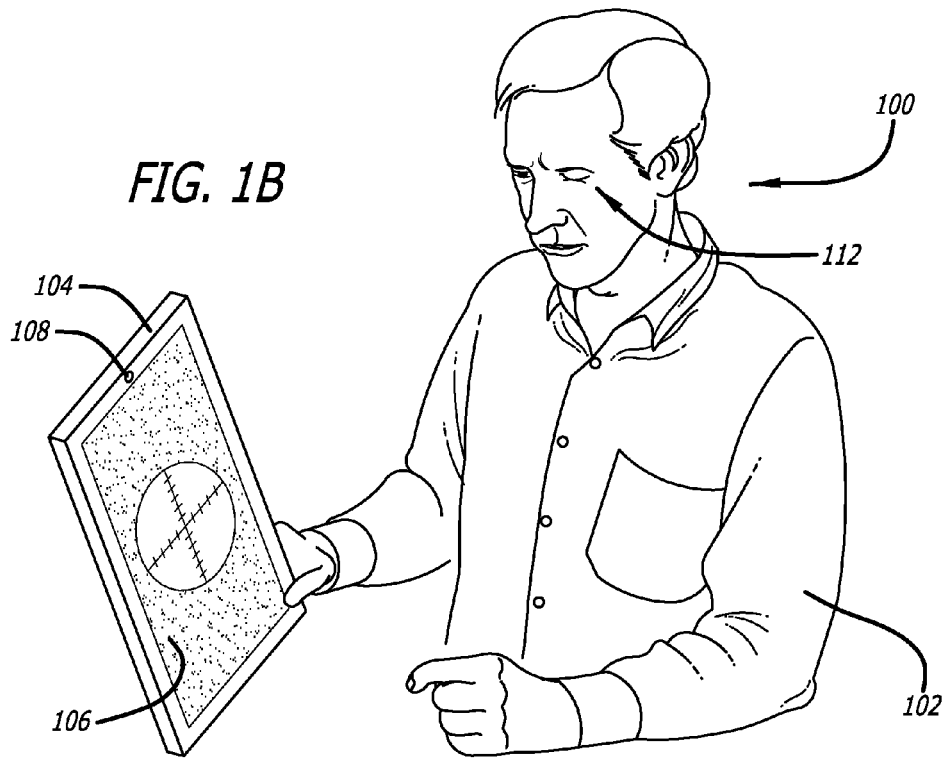

FIGS. 1A-1B illustrate an example situation of a user 102 providing an input to a computing device 104, in accordance with at least one embodiment. Although a portable computing device (e.g., a smart phone, an electronic book reader, or tablet computer) is shown, it should be understood that various other types of electronic devices that are capable of determining and processing input can be used in accordance with various embodiments discussed herein. These devices can include, for example, notebook computers, personal data assistants, video gaming consoles or controllers, and portable media players, among others.

In at least one embodiment, the user 102 can provide input to the computing device 104 to display a graphical overlay by closing one eye or winking. In this example, the user is playing a sniper game as displayed on a display screen 106 of the computing device 104. In this example, the computing device 104 is capturing image information of the user 102 with an imaging element or sensor 108, which can track each eye. As used herein, a sensor can refer to any imaging element, such as a camera, an infrared sensor, an ultraviolet sensor, and the like. In accordance with various embodiments, FIG. 1A shows one example view of the sniper game, such as if the user is walking or moving from one part of a level to another where both eyes of the user 102 are in an open state 110 (except for the occasional natural blinking). Then, in FIG. 1B, the user 102 has closed one eye (in a closed state 112) and, in response, the computing device 104 has displayed a magnified version of the view from FIG. 1A along with a crosshair to simulate a scope or aiming mode of the sniper game. In this example, the scope mode of the sniper game may last only as long as the eye of the user 102 remains in the closed state 112 to simulate the experience of actually aiming at a target. Alternatively, the user could wink once to cause the scope mode overlay to be displayed, then play the game in the scope mode until desired, at which point, the user 102 could wink again, or provide a touch selection input, or voice command, to remove the scope mode overlay and go back into the regular mode, as shown in FIG. 1A.

Figure 2A:
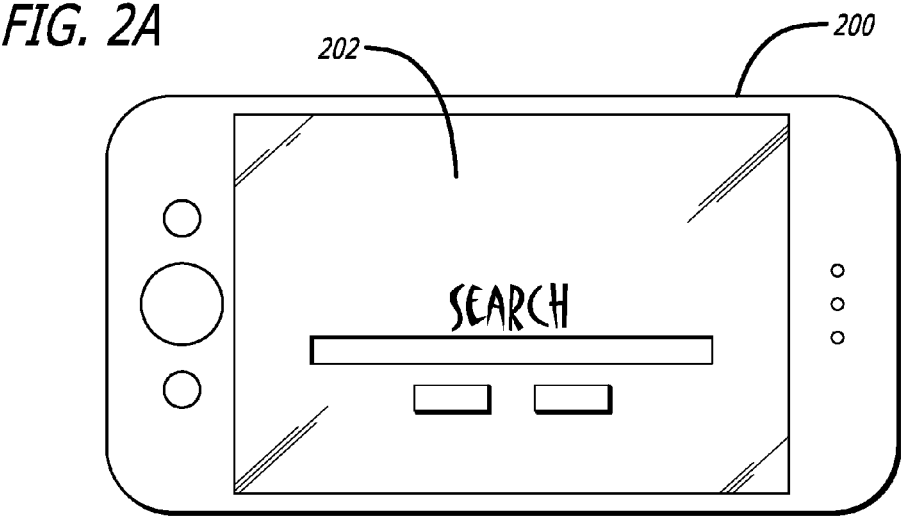
FIGS. 2A-2B illustrates an example web browser implementation for a user providing an eye closure input to a computing device in accordance with at least one embodiment.
Figure 2B:
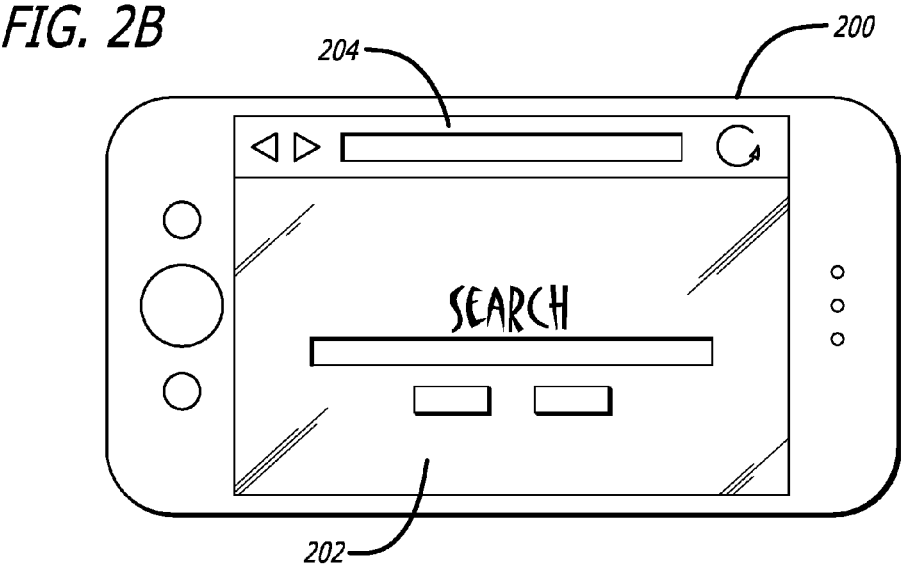

FIGS. 2A-2B illustrate an example graphical user interface (GUI) on a computing device 200, in accordance with at least one embodiment. In this example, FIG. 2A illustrates the computing device 200 with a webpage displayed on the display element 202 in a viewing or reading mode. Accordingly, in response to detecting a wink (i.e., closing and opening one eye), a navigational bar 204, in this example, is revealed or displayed, as shown in FIG. 2B. In various examples, the wink could be used to reveal any sort of chrome or menu, such as a user's favorite applications, navigational items, tools, most recently used applications, and the like. In one example, the wink could be used as a global device gesture or be provided as part of an application programming interface (API) for use within applications. A wink could also be used as a shortcut or clutch to invoke or enable various other functions or applications. Therefore, a wink can be used as a shortcut to various menus, navigational elements, shortcuts, and the like, in accordance with various embodiments.

Figure 3A:
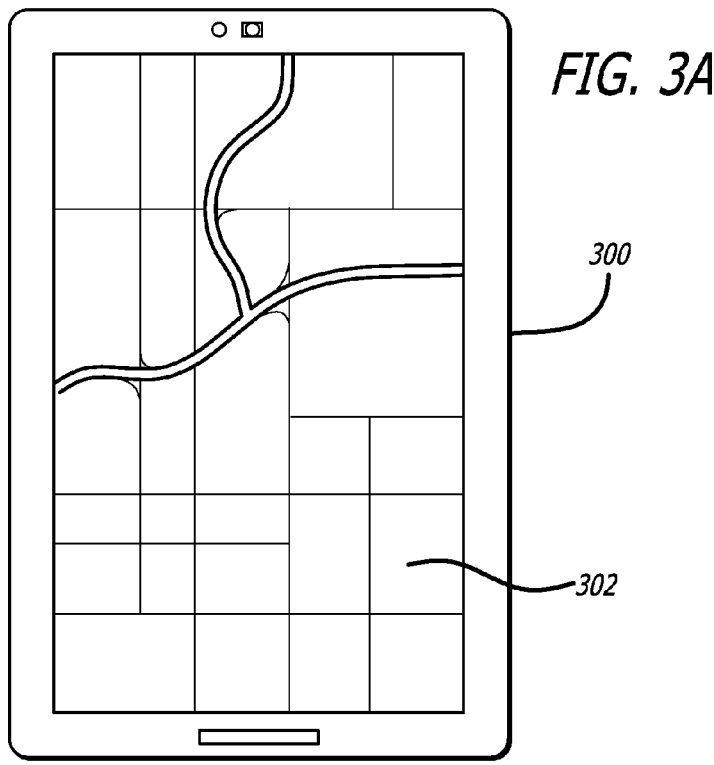
FIGS. 3A-3B illustrates an example map application implementation of a user providing an eye closure input to a computing device in accordance with at least one embodiment.
Figure 3B:
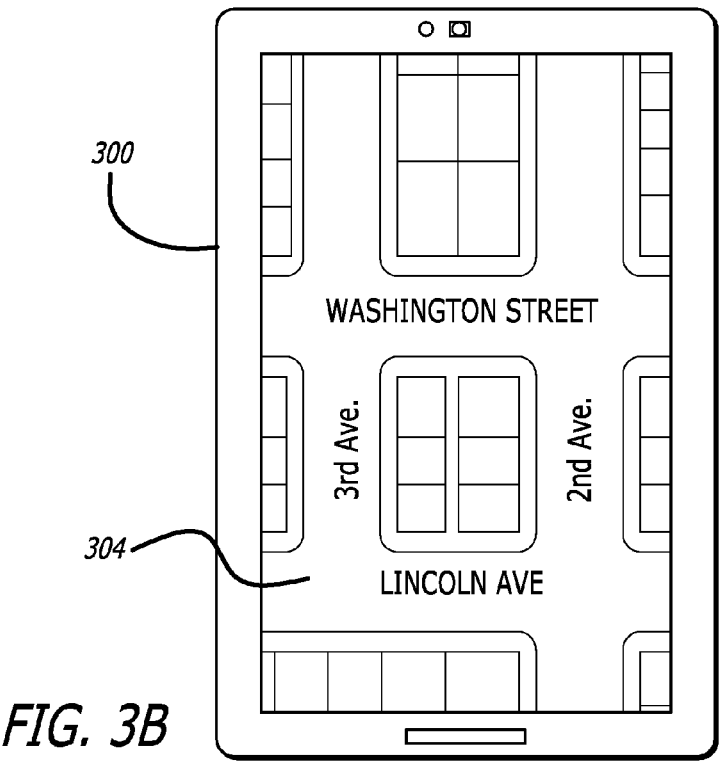

FIGS. 3A-3B illustrate an example map application displayed on a display element 302 on a computing device 300, in accordance with at least one embodiment. In this example, FIG. 3A illustrates a map of a region and a user could wink to zoom in or magnify an area of the region, as shown in FIG. 3B. In this example, providing one wink could zoom in a first distance, providing a second wink could zoom-in a second distance, and so on. In at least one embodiment, a user could wink with one eye to zoom in and wink with the opposite to zoom out. For example, the user could wink with their right eye to zoom in and wink with their left eye to zoom out. Additionally, the computing device 300 could track the user's gaze direction to determine a location on the map (a location of the display element 302 corresponding to the location on the map) where the user is looking when providing the wink to magnify or zoom in on that location. Further, a wink could be used to provide a traffic overlay of a current view of a map, a satellite image view from a road map view, a street view, and the like. Additionally, winking with a different eye could cause one of these alternate views to be displayed. A wink gesture to magnify content could also be used by various other applications, in accordance with various embodiments. Therefore, the user could wink to provide a traffic or other overlay, wink to provide alternative map types, wink to zoom in on content, wink to zoom out, and utilize gaze tracking to determine a magnification focus or center point.

Figure 4A:
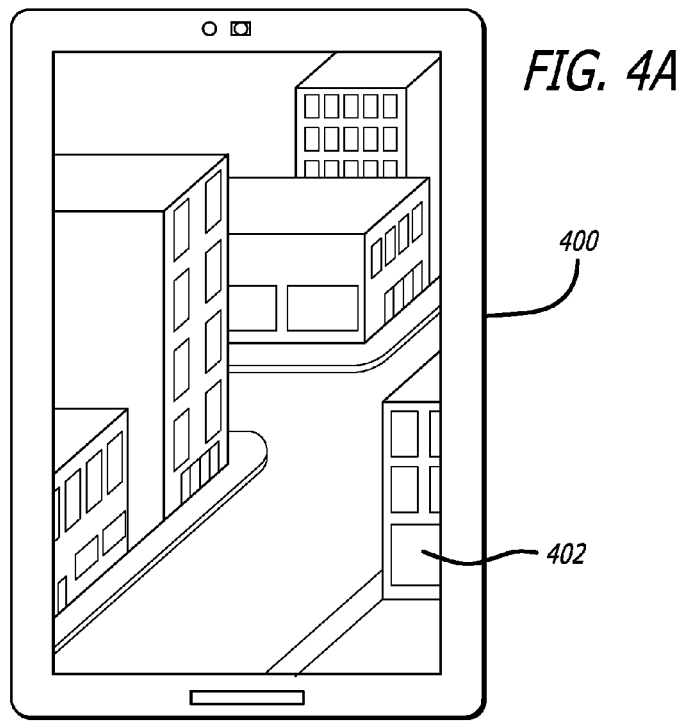
FIGS. 4A-4B illustrates an example implementation of a user providing an eye closure input to an application on a computing device in accordance with at least one embodiment.
Figure 4B:
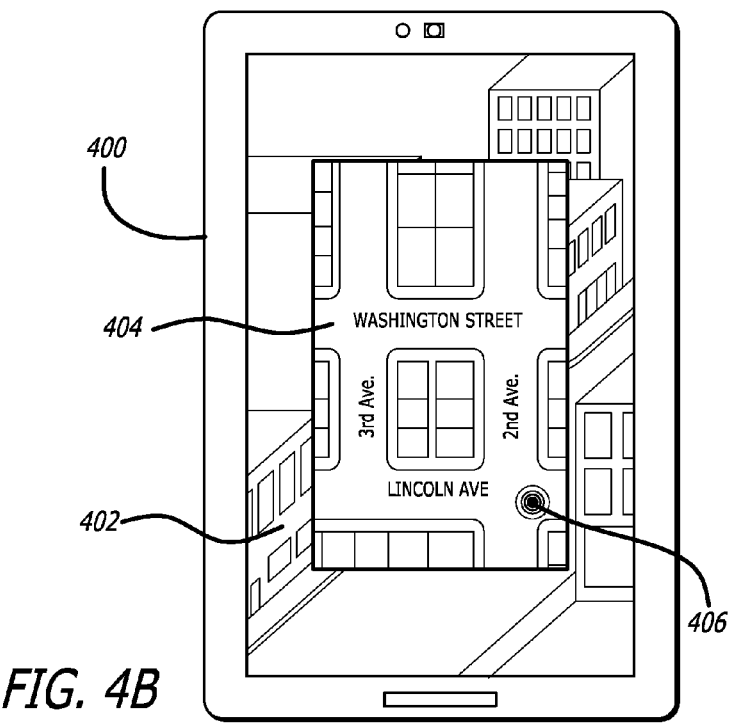

FIGS. 4A-4B illustrate another example GUI on a computing device 400 displaying an example of what could either be a game or an augmented reality application on a display element 402, in accordance with various embodiments. First, considering the gaming example, the user in FIG. 4A could be walking down the street or driving a vehicle in an urban level and wish to see globally where they are within the level. FIG. 4B shows an example map 404 for the level and the user's current location 406 on the map displayed in response to the computing device 400 detecting that the user has closed one eye, as discussed elsewhere herein. In this example, the map could be revealed as an overlay for the duration of time the user has the one eye closed. Alternatively, the user could provide a quick wink to pause the game or to reveal the map with the ability to reopen the eye and view the content of the map with both eyes. Then, upon providing a subsequent input, could return back to the view of FIG. 4A. Additionally, within a gaming environment, providing a wink could be used to check various other things, such as tool inventory, tasks, lives, health or any other information that a user would like quick access to or potentially only need access to for relatively short periods of time. In another example, FIG. 4A could be an augmented reality application displaying a live view of the surrounding environment as captured by a camera. In this example, the user could be provided with a map 404 of the region they are currently in and their current location 406 within the region.

Figure 5A:
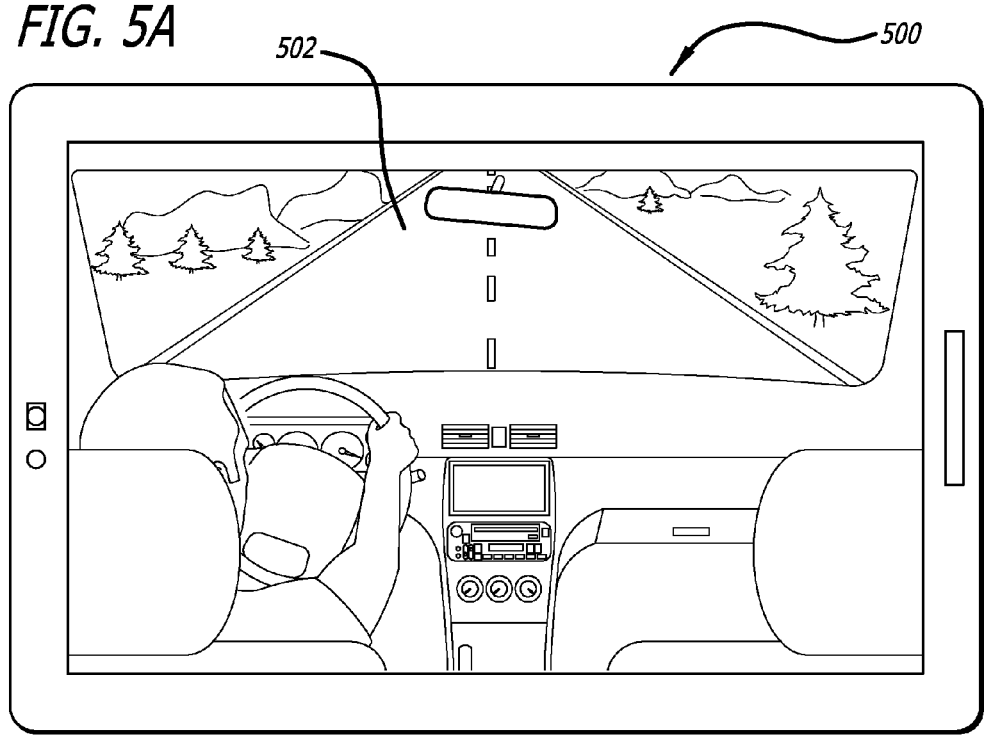
FIGS. 5A-5B illustrates an example driving game implementation of providing an eye closure input to a computing device in accordance with at least one embodiment.
Figure 5B:
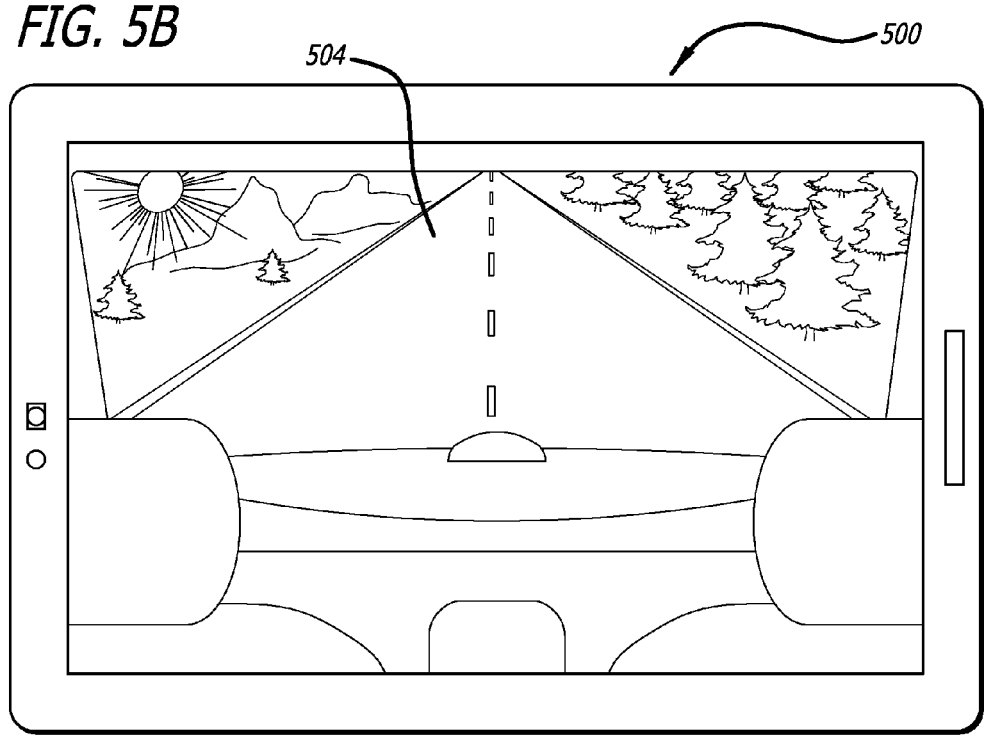

FIGS. 5A-5B illustrate another example gaming application displayed on a computing device 500, in accordance with various embodiments. In this example, FIG. 5A illustrates a user playing a driving game in a default forward view 502 that a driver of a car would see when actually driving. Accordingly, the user could close one eye to look in a virtual rearview mirror view 504 of the game, as shown in FIG. 5B. Since while driving it is important to be looking in the forward view for the vast majority of time, a reasonable rearview minor application for the game would be to display the rearview minor view 504 while one eye of the user is closed, and then the forward looking view 502 when the user reopens the eye. Therefore, a user closing one eye or winking can cause an alternate view of the application to be displayed, in accordance with various embodiments.

Figure 6:
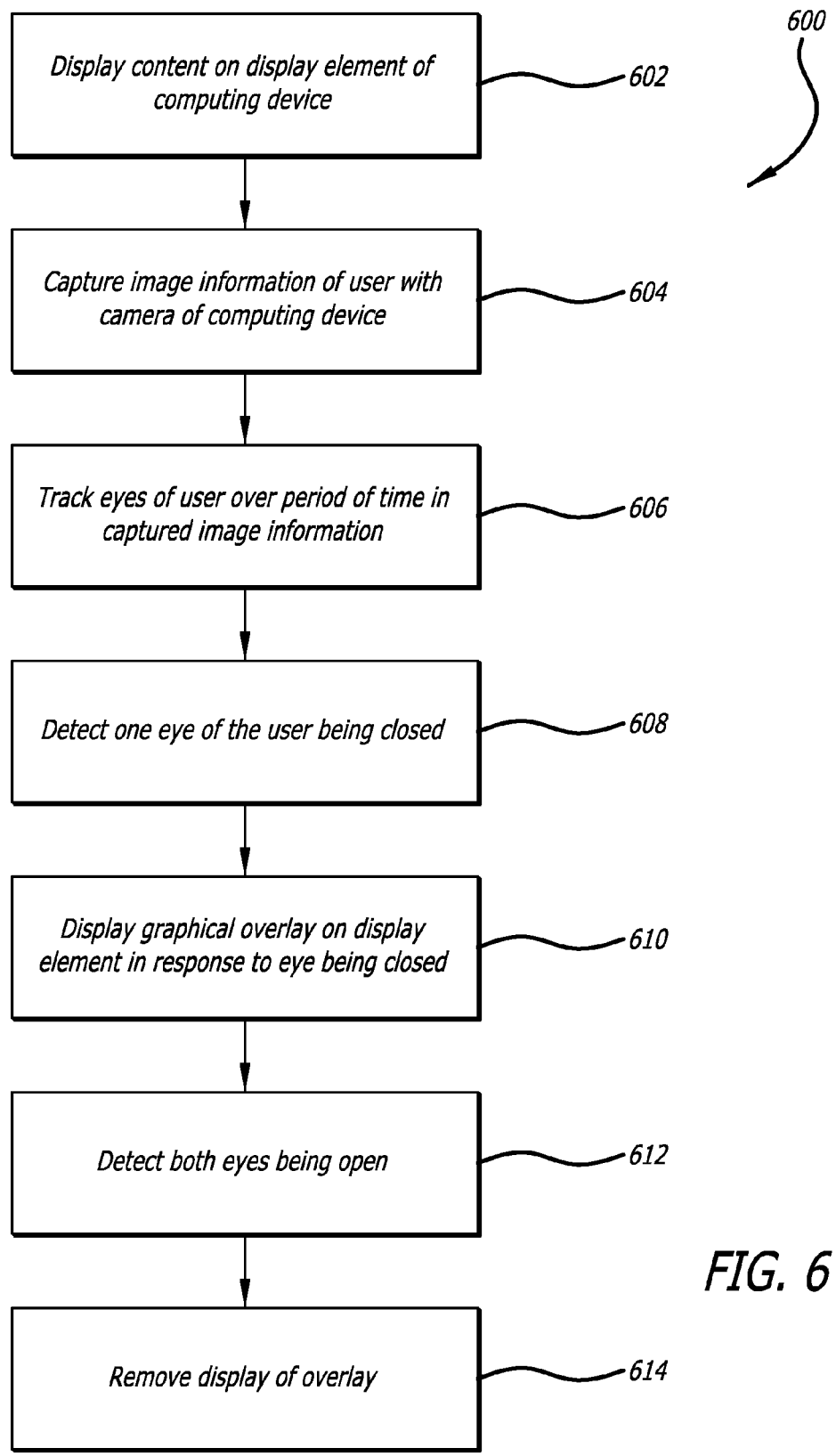
FIG. 6 illustrates an example process for providing an eye closure input to a computing device that can be used in accordance with at least one embodiment.

FIG. 6 illustrates an example process 600 for detecting an eye input from a user of a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, content is displayed 602 on a display of a computing device while image information of a user is being captured 604. In this example, the image information can include information associated with tracking each of two eyes of the user over a period of time that the user is engaging the computing device. In response to detecting one eye of the user being in a substantially closed state 608 while the other eye is detected to be in an open state, a graphical overlay can be displayed over content on the display element 610. Accordingly, the response to detecting one eye being in the substantially closed is not limited to a graphical overlay. For example, in response to detecting one eye being in the closed state, any audio (e.g. notification, directions, information, audio/conversational interface, etc.), visual (e.g. overlay, menu, popup, page, notification, information, interface, etc.), or haptic response or feedback could be generated or provided. In one example, once the computing device detects both eyes being open again 612, the overlay can be removed from the display element 614. Alternatively, the overlay could be displayed only as long as the user keeps one eye closed or, alternatively, the user could wink (i.e., closing and opening one eye) to display the overlay and provide some other input (i.e., a second wink, touch selection input, or voice command) to remove the overlay. Various other approaches can be used as well as discussed or suggested elsewhere herein.

As discussed herein, an overlay can include a menu containing selectable graphical elements to perform functions related to an application, game, or content, to global navigational features of the computing device in general, or to alternate views, features, or supplemental content for an application, game, or content currently being displayed on the display element. A wink (i.e., closing and opening one eye) can be associated with one command or input and closing one eye and holding it closed for a given period of time could be associated with another command or input. Further, different eyes can be associated with different inputs or commands. For example, closing or winking the right eye can reveal an overlay menu and winking or closing the left eye could launch and open an email application. In another example, holding the right eye closed for a period of time could launch a map application, holding the left eye closed could reveal a traffic overlay on a default view of the map, providing a wink with the right eye could zoom in on an area of the map, and providing a wink with the left eye could zoom out from the area. Additionally, a wink could be used to initiate spell check within a word processing application or a wink could bring up a user's contacts within a phone, email, or messaging application. Various other approaches and combinations can be used as well with various applications and uses as discussed or suggested elsewhere herein.

In another example, a user could observe a 'true' three-dimensional (3D) experience from a standard two-dimensional (2D) display screen by showing a correct image to the each eye of the user. When the user's left eye is closed, the correct image for the right eye can be displayed. Likewise, when the right eye is closed, the correct image for the left eye can be displayed. Accordingly, if the user alternates closing their left and right eyes, they will experience a 3D effect.

In various embodiments, the image information can be captured by an infrared (IR) sensor that detects infrared radiation reflected from the back of the user's eyes (retinal reflection) to determine if one eye is closed. In other embodiments, template matching could be used to match features of a user to training or template images to determine whether one eye of the user is closed in one or more frames captured by an imagining element, such as by detecting the presence of light or dark spots in the location where the user's eyes normally are located. Accordingly, detecting a state of each eye could utilize either an analog or Boolean detection method. Various other methods and applications can be used to detect whether a user has winked or closed one eye in accordance with various embodiments.

Figure 7A:
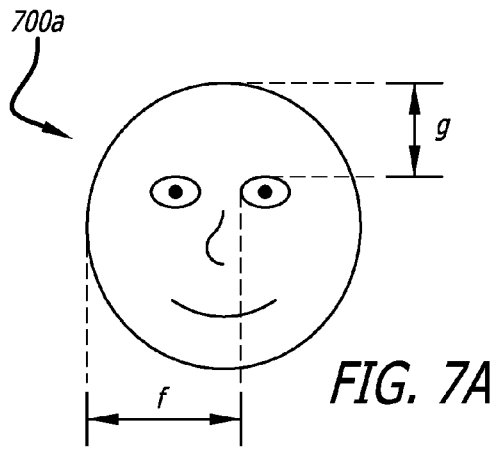
FIGS. 7A-7F illustrate example approaches to determining a user's gaze direction that can be used in accordance with various embodiments.
Figure 7B:
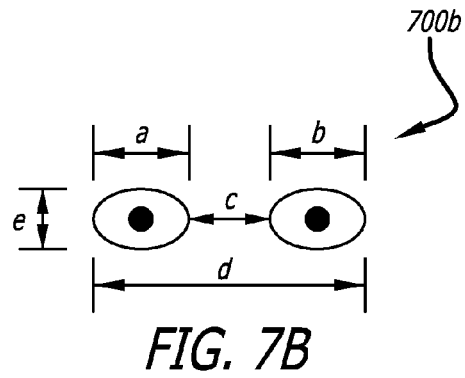
Figure 7C:
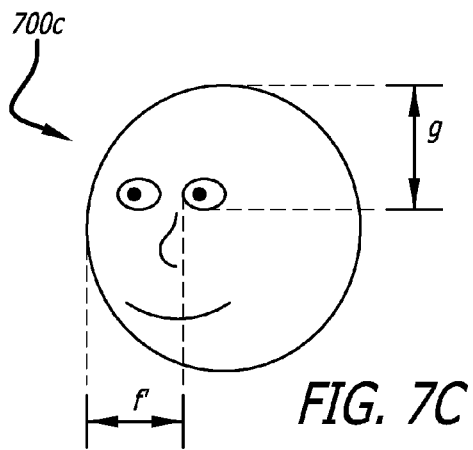
Figure 7D:
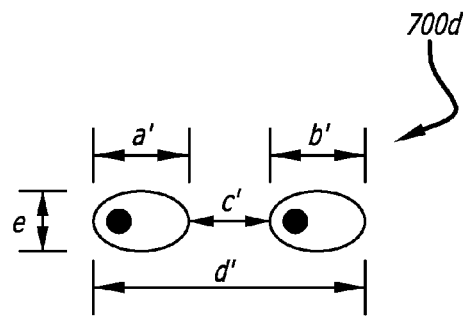
Figure 7E:
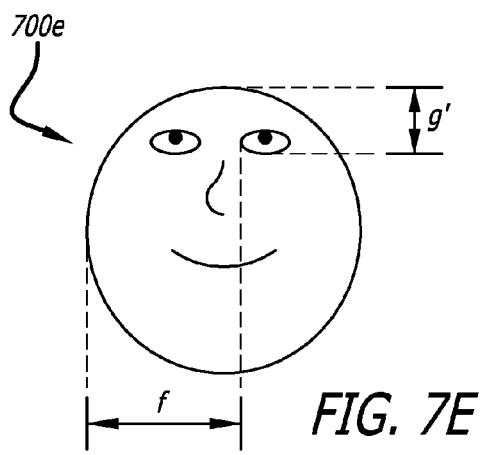
Figure 7F:
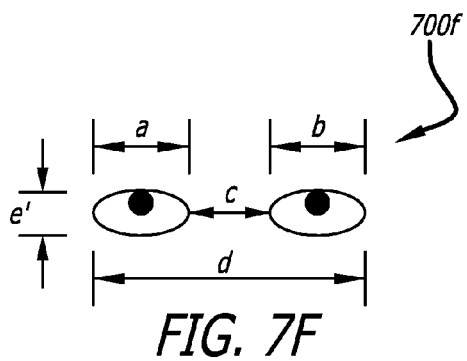

FIG. 7A illustrates an example 700 wherein images are captured and analyzed to locate the relative positions of the user's eyes and head in order to determine whether a user is winking or closing a single eye, as opposed to just blinking. In a system wherein the algorithm is able to differentiate the user's pupils, the system can also utilize the relative position of the pupils with respect to the eye position to identify a wink or single eye closure. For example, FIG. 7B illustrates a case where the user is looking "left" (or to the user's "right"), such that a center point of each user's pupil is to the left (in the image) of the center point of the respective eye. Similarly, FIG. 7C illustrates a case where the user is looking "up". As can be seen, the positions of the pupils have moved above a center point of the eyes. The position of the pupils can change without the user moving his or her head. A system in some embodiments can differentiate between different types of movement, such as between eye tremor, smooth tracking, and ballistic movements.

Figure 8A:
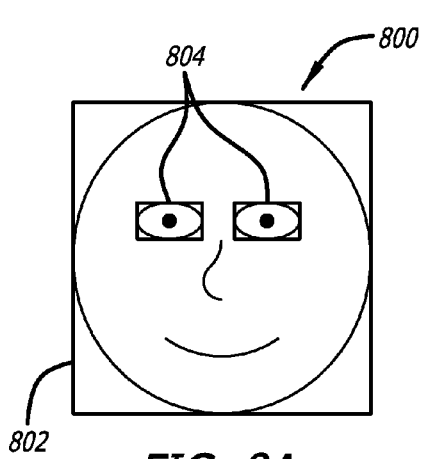
FIGS. 8A-8F illustrate example approaches to determining a user's gaze direction that can be used in accordance with various embodiments.

Another example technique that can be used in determining a gaze direction of a user us described with respect to FIGS. 8A-8F. In this example, various approaches attempt to locate one or more desired features of a user's face to determine various useful aspects for determining the relative orientation of a user. For example, an image can be analyzed to determine the approximate location and size of a user's head or face. FIG. 8A illustrates an example wherein the approximate position and area of a user's head or face 800 is determined and a virtual "box" 802 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 804 of each of the user's eyes (or in some cases the eyes in tandem). By determining the location of the user's eyes as well, advantages can be obtained as it can be more likely that the image determined to be the user's head actually includes the user's head, and it can be determined whether the user is gazing at the computing device. Further, the relative movement of the user's eyes can be easier to detect than the overall movement of the user's head when performing motions such as nodding or shaking the head back and forth.

Figure 8B:
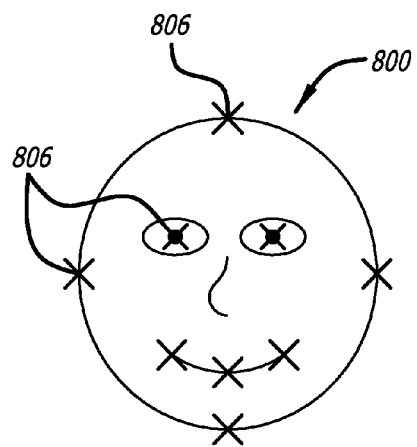

Various other algorithms can be used to determine the location of features on a user's face. For example, FIG. 8B illustrates an example method where various features on a user's face are identified and assigned a point location 806 in the image. The system thus can detect various aspects of a user's features. Such an approach provides advantages over the general approach of FIG. 8A in certain situations, as various points along a feature can be determined, such as the end points and at least one center point of a user's mouth.

Figure 8C:
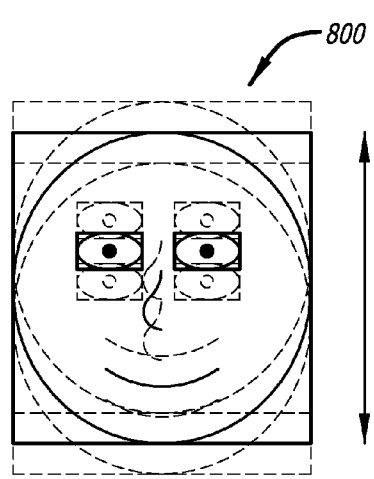
Figure 8D:
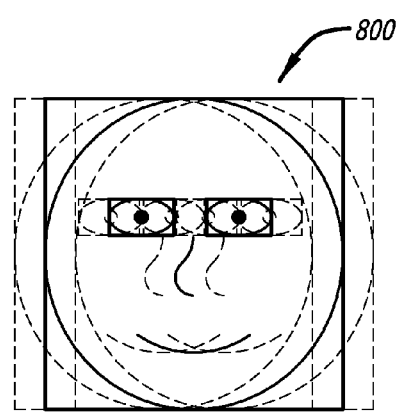
Figure 8E:
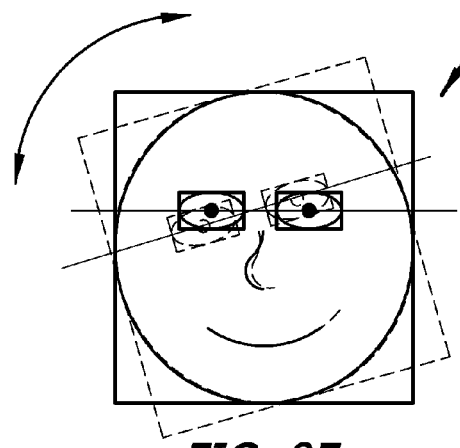

Once the positions of facial features of a user are identified, relative motion between the user and the device can be detected. For example, FIG. 8C illustrates an example where the user's head 600 is moving up and down with respect to the viewable area of the imaging element. As discussed, this could be the result of the user shaking his or her head, or the user moving the device up and down, etc. FIG. 8D illustrates a similar example wherein the user is moving right to left relative to the device, through movement of the user, the device, or both. As can be seen, each movement can be tracked as a vertical or horizontal movement, respectively, and each can be treated differently. As should be understood, such a process also can detect diagonal or other such movements. FIG. 8E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted.

Figure 8F:
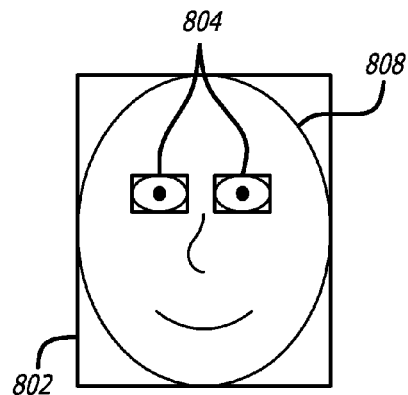

FIG. 8F illustrates another advantage of using an approach such as that described with respect to FIG. 8B to determine the position of various features on a user's face. In this exaggerated example, it can be seen that the features of a second user's head 808 have a different relative position and separation. Thus, the device also can not only determine positions of features for a user, but can distinguish between different users. As discussed later herein, this can allow the device to perform differently for different users. Also, the device can be configured to detect how close a user is to the device based on, for example, the amount and ratio of separation of various features, such that the device can detect movement towards, and away from, the device. This can help to improve the accuracy of gaze detection.

Figures 9A, 9B:
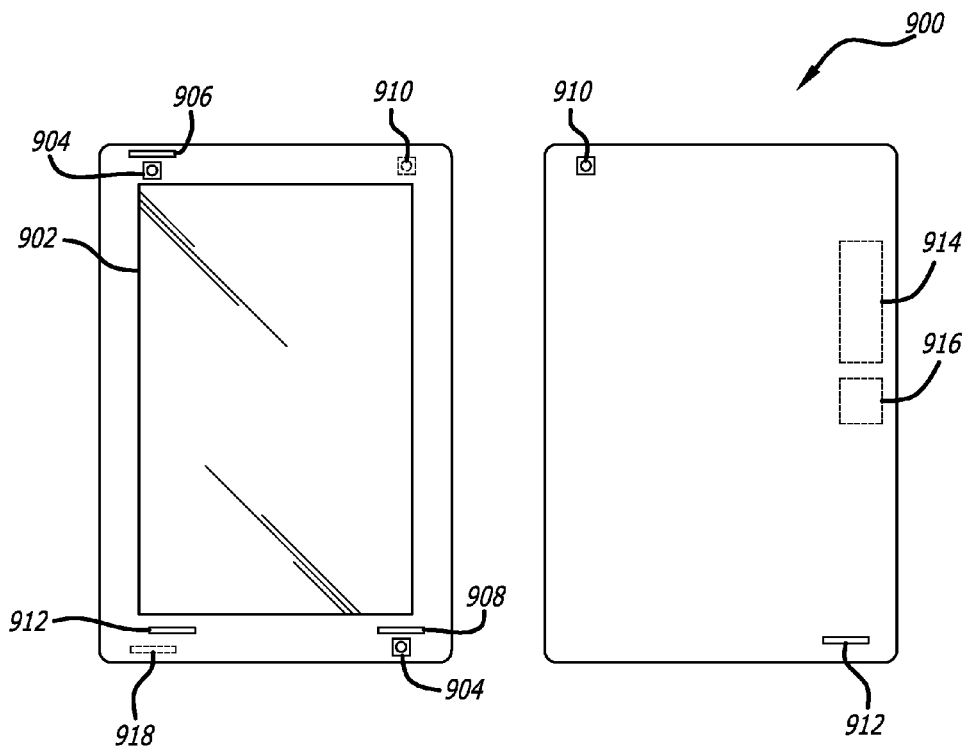
FIGS. 9A-9B illustrate an example computing device that can be used to implement aspects of various embodiments.

FIGS. 9A and 9B illustrate front and back views, respectively, of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
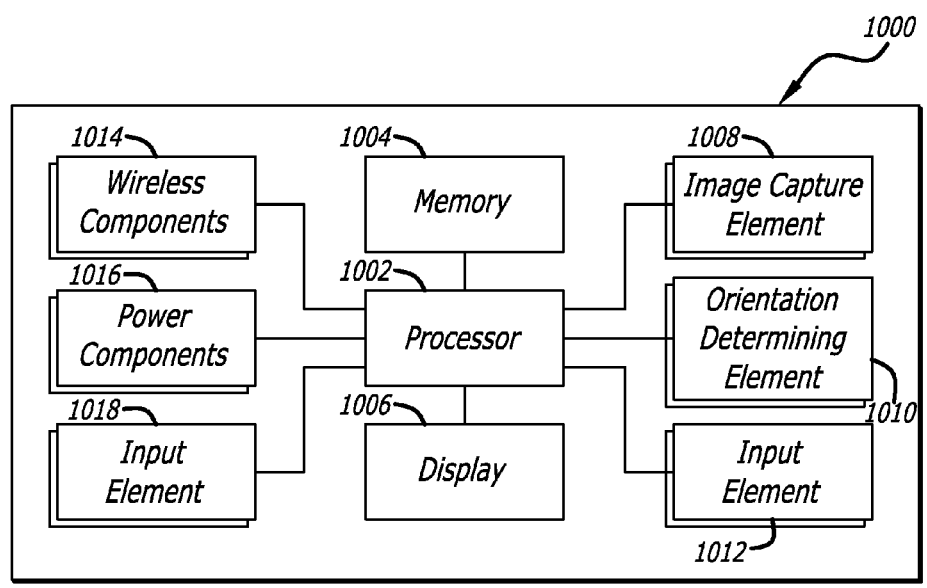
FIG. 10 illustrates example components that can be used with a device such as that illustrated in FIGS. 9A-9B.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
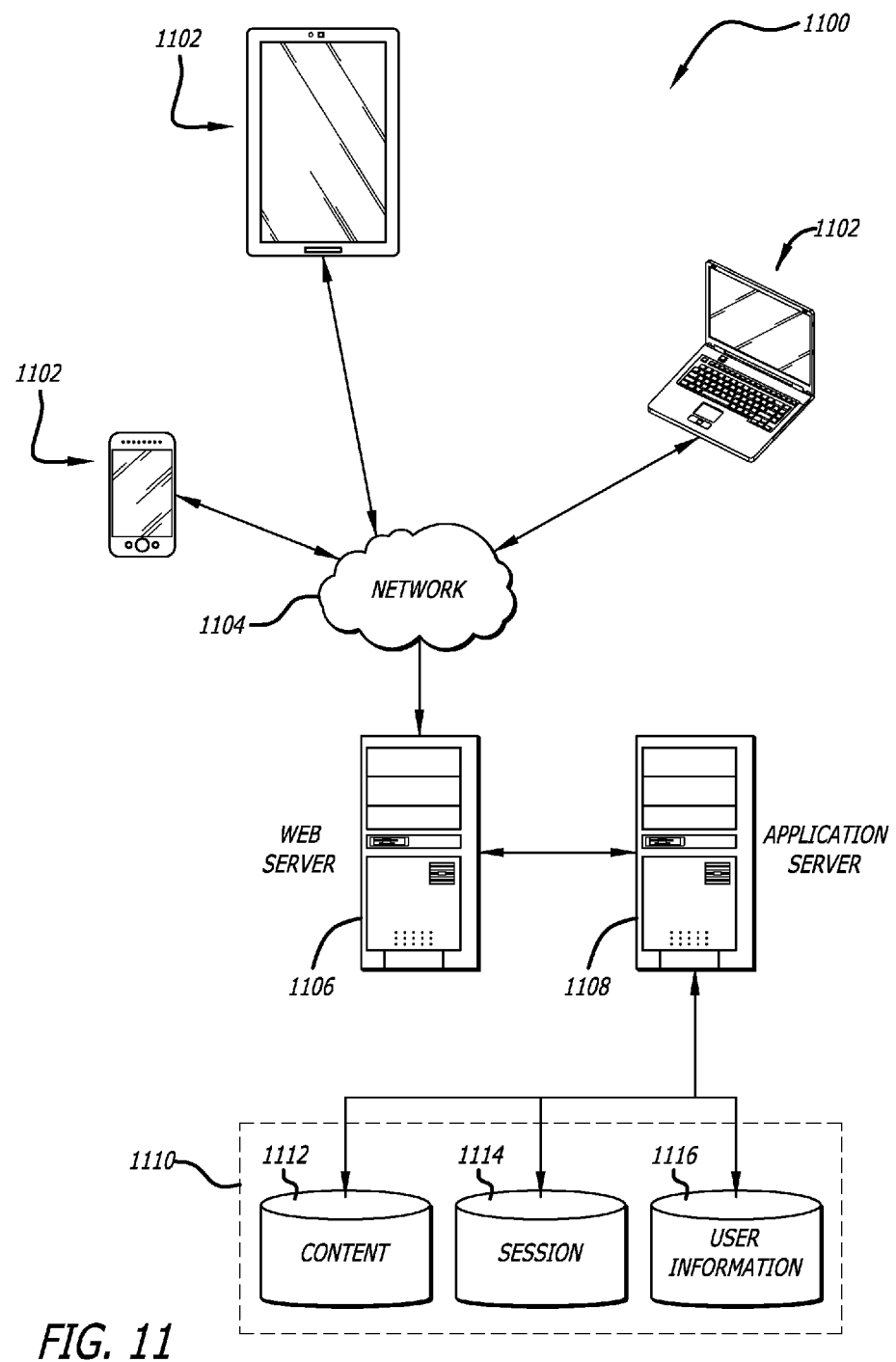
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
displaying first content on a touch display element of a computing device;
capturing, using a camera of the computing device, a first series of images of a user;
analyzing the first series of images to determine a state of each eye of the user;
in response to determining that a first eye of the user is in a closed state for at least a threshold amount of time while a second eye of the user is in an open state, displaying a graphical overlay over the first content on the touch display element, the graphical overlay providing additional information relating to the first content and including a navigational element;
detecting a touch input provided to an area of the touch display element associated with the navigational element on the graphical overlay; and
in response to detecting the touch input, displaying second content on the touch display element of the computing device.

2. The computer-implemented method of claim 1, wherein determining the state of each eye of the user includes attempting to detect infrared (IR) radiation reflected by each eye of the user using at least one IR sensor, wherein detecting the first eye being in the closed state includes detecting IR radiation from only the second eye for at least the threshold amount of time.

3. The computer-implemented method of claim 1, wherein the graphical overlay is a navigational menu enabling the user to at least one of navigate to a home screen, access recent files, applications, or pages, or search content within the computing device.

4. The computer-implemented method of claim 1, wherein the graphical overlay is only displayed in response to detecting the first eye being in the closed state for at least the threshold amount of time while the second eye is in the open state.

5. A computer-implemented method, comprising:
   under the control of one or more computer systems configured with executable instructions,
      displaying, on a display element of a computing device, a first content;
      detecting, using a sensor of the computing device, an eye of a user being closed;
      in response to detecting the eye being closed, displaying a graphical overlay including a navigational element over at least a portion of the first content on the display element;
      receiving a touch input to the navigational element on the graphical overlay; and
      in response to receiving the touch input, displaying second content on the display element.

6. The computer-implemented method of claim 5, wherein the graphical overlay includes a navigational menu displayed over a portion of the first content, the navigational menu enabling navigation to at least one of a home screen, recent files, applications, or pages via the navigational element.

7. The computer-implemented method of claim 5, wherein the sensor is an infrared (IR) sensor and detecting the eye of a user being closed includes detecting IR radiation reflected by only one eye of the user.

8. The computer-implemented method of claim 5, wherein the second content is at least one of a home screen, a specific application, or a lock screen of the computing device.

9. The computer-implemented method of claim 5, wherein the graphical overlay is only displayed while the eye is closed.

10. A computing device, comprising:
   a processor;
   an imaging element;
   a display screen; and
   memory including instructions that, when executed by the processor, cause the computing device to:
      display, on a display element of a computing device, a home screen or an application when each of two eyes of a user is open;
      detect, using a sensor of the computing device, a first of the two eyes of the user being closed while a second of the two eyes is open;
      in response to detecting the first of the two eyes being closed, display a favorites application menu over the home screen or the application on the display element;
      detect, using the sensor of the computing device, the second of the two eyes of the user being closed while the first of the two eyes is open; and
      in response to detecting the second of the two eyes being closed, display an application history menu over the home screen or the application on the display element.

11. The computing device of claim 10, wherein the favorites application menu over the home screen or the application is displayed for a duration of time the first of the two eyes of the user is closed.

12. The computing device of claim 10, wherein the instructions, when executed by the processor, further enable the computing device to:
   display the home screen or the application on the display element in response to detecting each of the two eyes of the user being open.

13. The computing device of claim 10, wherein the favorites application menu and the application history menu are displayed as a graphical overlay.

14. The computing device of claim 10, wherein the sensor is an infrared (IR) sensor and detecting the eye of a user being closed includes detecting IR radiation reflected by only one eye of the user.

15. A non-transitory computer-readable storage medium storing instructions that, when executed by at least one processor, cause a computing device to:
   display, on a display element of a computing device, a first view of content;
   detect, using a sensor of the computing device, an eye of a user being closed;
   in response to detecting the eye being closed, display a graphical overlay including a navigational element over at least a portion of the first content on the display element;
   receive a touch input to the navigational element on the graphical overlay; and
   in response to receiving the touch input, display second content on the display element.

16. The non-transitory computer-readable storage medium of claim 15, wherein the sensor is an infrared (IR) and detecting the eye of the user being closed includes detecting IR radiation reflected by only one eye of the user.

17. The non-transitory computer-readable storage medium of claim 16, wherein the graphical overlay includes a navigational menu displayed over a portion of the first content, the navigational menu enabling navigation to at least one of a home screen, recent files, applications, or pages via the navigational element.

18. The non-transitory computer-readable storage medium of claim 15, wherein the graphical overlay is only displayed while the eye is closed.

\* \* \* \* \*